UNITED STATES PATENT OFFICE.

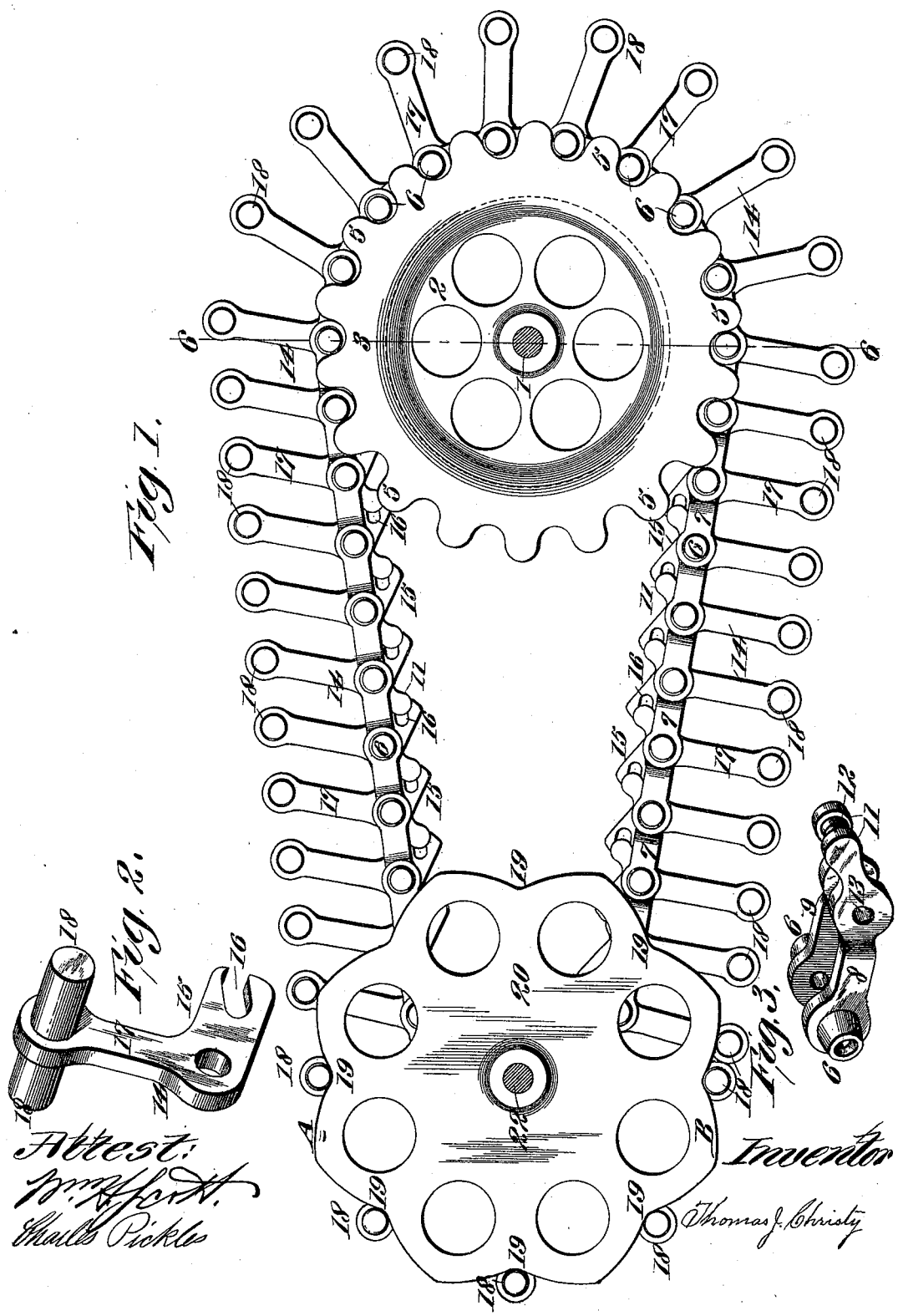

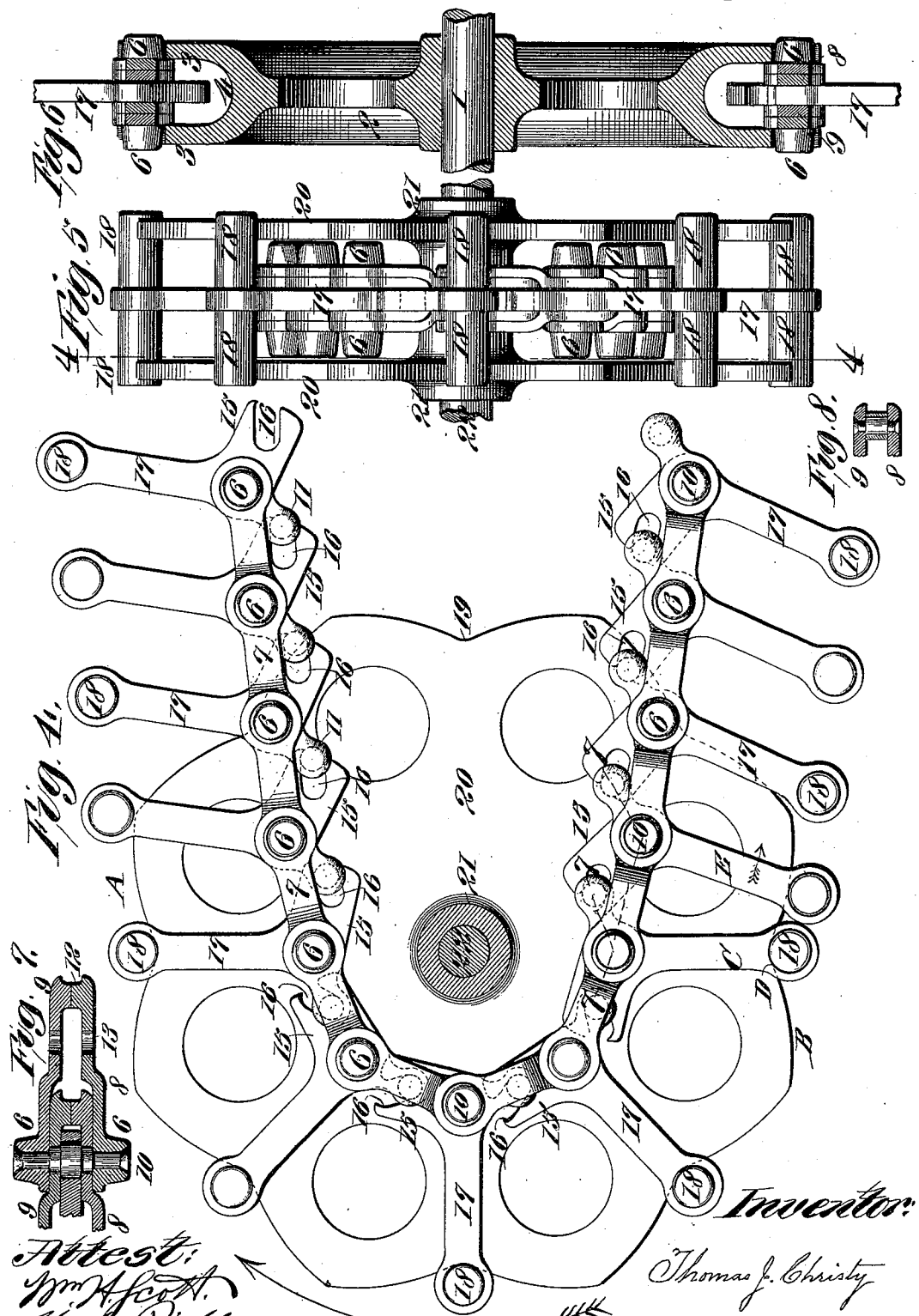

THOMAS J. CHRISTY, OF ST. LOUIS, MISSOURI.

DRIVE-CHAIN.

SPECIFICATION forming part of Letters Patent No. 587,387, dated August 3, 1897.

Application filed January 29, 1896. Serial No. 577,228. (No model.)

*To all whom it may concern:*

Be it known that I, THOMAS J. CHRISTY, of the city of St. Louis, State of Missouri, have invented certain new and useful Improvements in Drive-Chains, of which the following is a full, clear, and exact description, reference being had to the accompanying drawings, forming a part hereof.

My invention relates to drive-chains; and it consists in the novel construction, combination, and arrangement of parts hereinafter shown, described, and claimed.

Figure 1 is a side elevation of the front and rear sprocket-wheels of a bicycle carrying my improved drive-chain. Fig. 2 is a view in perspective of a bell-crank lever of which I make use in the construction of my improved chain. Fig. 3 is a view in perspective of a link of which I make use. Fig. 4 is a vertical sectional view on the line 4 4 of Fig. 5. Fig. 5 is a rear end elevation of the rear sprocket-wheel and chain. Fig. 6 is a vertical sectional view of the front sprocket-wheel and chain on the line 6 6 of Fig. 1. Fig. 7 is a horizontal sectional view of the bell-crank lever and link of which I make use in the construction of my improved chain, said view being taken approximately on the line 7 7 of Fig. 4. Fig. 8 is a detail horizontal sectional view of a modified form of one end of the link shown in Fig. 3.

Referring by numerals to the drawings, 1 represents the main driving-shaft, and the grooved sprocket-wheel 2 is securely fixed thereto in the usual way, and said sprocket-wheel has the flange 3 at each side of the groove 4, and said flanges are provided with the teeth or sprockets 5, which engage the projections 6 on the links 7.

The links 7, as shown, consist of the sections 8 and 9, so arranged as that the projections 6 are opposite each other, and the shouldered rivet 10 passes through said projections 6 and serve to connect said links together.
Each of said links is provided with extensions 11, having the lugs 12 upon their adjacent inner sides and at their free ends. The shouldered rivets 10 pass through the perforations 13 in said links 7 and the inner ends of the lugs 12 meet, thus forming a connection between the free ends of the projections 11.

The bell-crank lever 14 is pivotally mounted between the sections 8 and 9 of the link 7 and upon the shouldered rivet 10. In the short end 15 of said bell-crank lever is a recess or slot 16. The recess 16 of a particular link engages the lugs 12 of the next link in front of that particular link. The long arm 17 of the bell-crank lever has upon its outer end projections 18, which projections engage in the recesses 19 of the flanges 20 of the driven wheel. The flanges 20 are held a fixed distance apart by the hub 21, secured to the shaft 22.

In the operation of my improved chain the projections 6 upon the links 7 engage between the teeth of the driving sprocket-wheel and the projections 18 upon the bell-crank lever 17 engage between the teeth upon the driven sprocket-wheel.

I claim—

1. In a drive-chain, links pivoted together; each of which links consists of a pair of bars in parallel position and a pivot passing through the end of one link and also passing through the next link at a point intermediate of its ends and thus forming a projection upon said link; bell-crank levers mounted upon said pivots and between said bars, each of said bell-crank levers having an opening in its short end which opening is engaged by said projection upon the next adjoining link, substantially as specified.

2. In a drive-chain, links, each consisting of a pair of bars, a pin passing through one end of each link, said pin also passing through the next adjacent link at a point intermediate of its end, a bell-crank lever mounted between said bars and upon said pivot, connections between the free ends of said bars and engaging the short end of said bell-crank lever, and projections upon the long end of said bell-crank lever and designed to engage the sprockets of the driven wheel, said links carrying projections designed to engage the sprockets of the driving-wheel, substantially as specified.

3. In a drive-chain, the sections 8 and 9, the oppositely-arranged projections 6 at one end of said sections, the shouldered rivet 10 passing through said projections and connecting said sections, the extensions 11, the lugs 12 upon said extensions, the bell-crank lever 14 mounted upon the rivet 10 and between the sections 8 and 9 and having the recess 16 in its short end and designed to engage the lugs 12 of the next adjacent link, and the projections 18 upon the long end of said bell-crank lever, substantially as specified.

THOMAS J. CHRISTY.

Witnesses:
HENRY KAHLO,
CHARLES PICKLES.